UNITED STATES PATENT OFFICE.

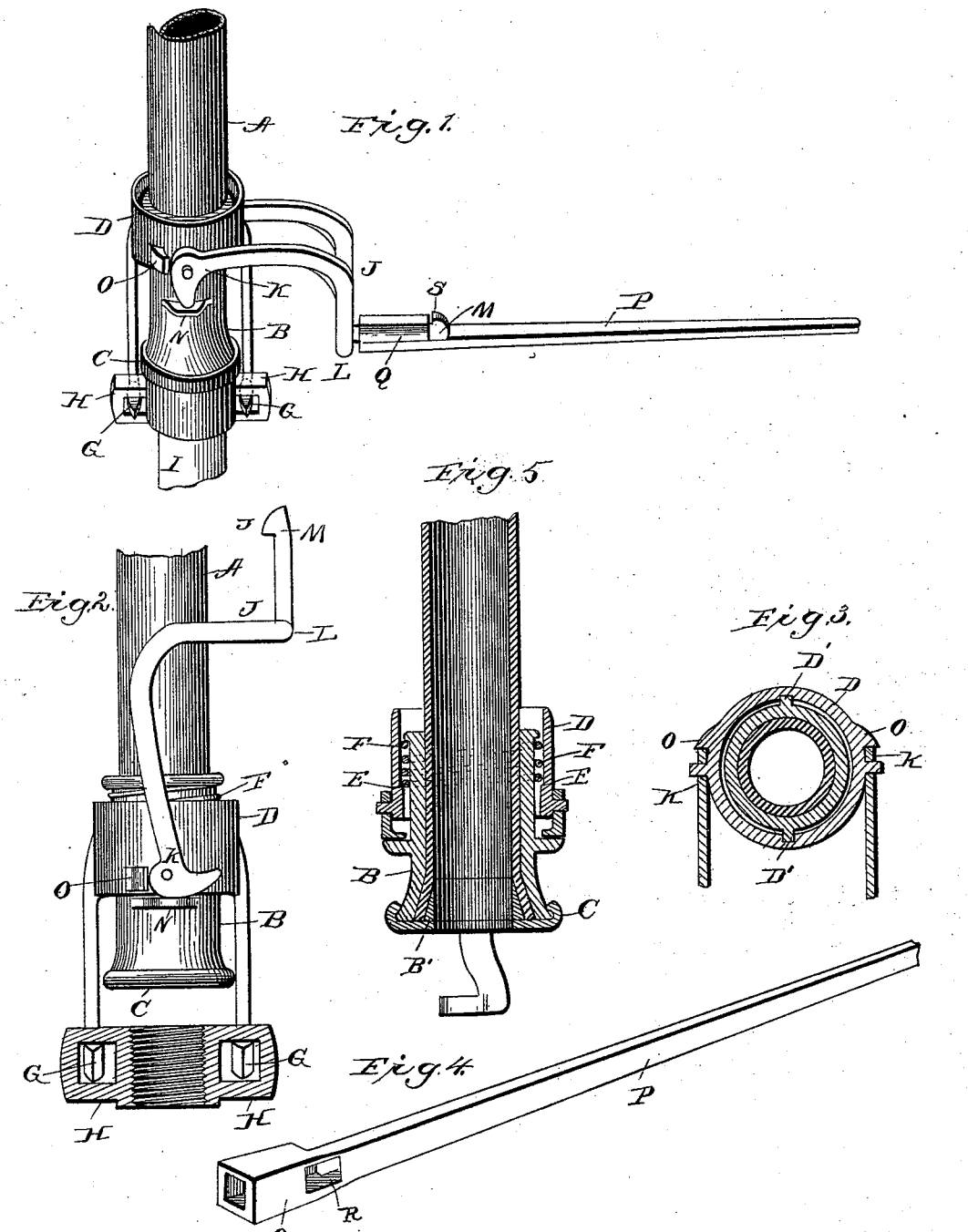

FRANK F. HOWE, OF MARIETTA, OHIO.

HOSE-COUPLING.

SPECIFICATION forming part of Letters Patent No. 536,350, dated March 26, 1895.

Application filed March 30, 1894. Serial No. 505,789. (No model.)

*To all whom it may concern:*

Be it known that I, FRANK F. HOWE, of Marietta, in the county of Washington and State of Ohio, have invented certain new and useful Improvements in Hose-Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in hose couplings; and the object of the same is to provide an improved coupling especially designed for connecting hose with hydrants or other stationary supply pipes.

The invention consists in the novel features of construction hereinafter fully described and claimed, and illustrated in the accompanying drawings, in which—

Figure 1 is a perspective view of my improved coupling in an operative position. Fig. 2 is a side elevation of the same. Fig. 3 is a cross sectional view. Fig. 4 is a detached view of the operating lever. Fig. 5 is a longitudinal sectional view.

A designates the hose having at its outer end the sleeve B which carries the packing ring C. The outer end of sleeve B is flared or enlarged as shown and fitting in the hose end is the tubular wedge B' which conforms in contour to the sleeve end so that by its use the hose end is spread and thereby secured in the sleeve, and a tight joint is formed. The hose is movable longitudinally through the head D but is prevented from turning therein by the ribs D'. The head is formed with the interior flange E upon which bears the coiled spring F which at its outer end is secured to the sleeve B, thus holding the sleeve normally drawn inward through the head.

G are hooks extended outward from the head which are adapted to engage keepers H on opposite sides of the hydrant or other discharge I. Pivotally secured to the head is the frame J which consists of the two cam arms K which are connected at their outer ends by the curved bar L which is so formed in order to incase the hose, and extending from this bar is the lever hold M. The inner or cam ends of the arms K are adapted to bear on lugs N projected from opposite sides of sleeve B so that when the frame J is turned laterally as shown in Fig. 1 the said sleeve and hose will be forced forward and tightly coupled with the hydrant, the hooks G engaging in keepers H serving to draw the same together. Stops O behind the cams serve to stop their movement when they have been turned down sufficiently far. As soon as frame J is turned inward on the hose the latter will be drawn into the head and from the hydrant by the coiled spring as before described.

For operating the coupling I provide the lever P having at its end the elongated eye Q and the transverse recess R. The lever hold M together with its lip S is adapted to pass through eye Q and said lip is adapted to engage the inner end of the eye to hold the lever from slipping longitudinally from position. Recess R is provided so that this hold may be easily broken when the lever is to be removed. It will be noted that the eye of the lever is substantially square so as to form a convenient key for turning on and off the water in side-walk and other similar hydrants.

By means of the device herein shown and described a very quick coupling can be effected which forces the pipe ends together with force sufficient to effect a tight joint and which may be instantly detached when not in use.

Having thus fully described my invention, what I claim as new, and desire to secure by Letters Patent, is—

1. The combination of tubular head D, sleeve B movable therethrough, a hose secured in said sleeve, a spring arranged between the head and sleeve for holding the latter normally retracted in the head, a hydrant to which the head is adapted to be attached, and a means for forcing the sleeve B thereto against the pressure of said spring, substantially as shown and described.

2. An improved hose coupling comprising a head having an interior flange, a means for attaching the head to a hydrant or other discharge, a hose movable through the head, sleeve B secured to the hose and provided with an external flange, an expansible spring arranged between the flanges of said head and sleeve for holding the hose normally retracted in the head, and a means for moving forward the hose in the head, substantially as shown and described.

In testimony whereof I affix my signature in presence of two witnesses.

FRANK F. HOWE.

Witnesses:
C. W. RICHARDS,
P. W. NEECE.